US012741243B2

(12) United States Patent
Higginson et al.

(10) Patent No.: US 12,741,243 B2
(45) Date of Patent: Sep. 22, 2026

(54) POLYETHERSULFONE FIBER WEBS

(71) Applicant: Hollingsworth & Vose Company, East Walpole, MA (US)

(72) Inventors: Keith Higginson, Leominster, MA (US); Abdoulaye Doucouré, Roanoke, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 15/484,497

(22) Filed: Apr. 11, 2017

(65) Prior Publication Data

US 2018/0290087 A1 Oct. 11, 2018

(51) Int. Cl.

| | |
|---|---|
| ***B01D 39/00*** | (2006.01) |
| ***B01D 39/16*** | (2006.01) |
| *B01D 46/00* | (2022.01) |
| *B01D 46/52* | (2006.01) |
| *B01D 46/54* | (2006.01) |

(52) U.S. Cl.

CPC ...... *B01D 39/1623* (2013.01); *B01D 46/0027* (2013.01); *B01D 46/521* (2013.01); *B01D 46/546* (2013.01); *B01D 2201/12* (2013.01); *B01D 2239/0414* (2013.01); *B01D 2239/0631* (2013.01); *B01D 2239/065* (2013.01); *B01D 2239/0654* (2013.01); *B01D 2239/1233* (2013.01); *B01D 2239/1291* (2013.01)

(58) Field of Classification Search

CPC ................ B01D 39/00; B01D 39/1623; B01D 2239/0654; B01D 2239/065; B01D 2239/0631; B01D 2239/1291; B01D 2239/1233; B01D 2239/0414; B01D 46/00; B01D 46/0027; B01D 46/546; B01D 46/521; B01D 2201/12; B01D 2239/025; B29C 35/10; D01D 5/04

USPC ........................................................... 55/527

See application file for complete search history.

(56) References Cited

U.S. PATENT DOCUMENTS

| | | | | |
|---|---|---|---|---|
| 4,548,628 | A * | 10/1985 | Miyake | D04H 1/492 55/528 |
| 4,650,506 | A | 3/1987 | Barris et al. | |
| 5,580,459 | A | 12/1996 | Powers et al. | |
| 5,672,399 | A | 9/1997 | Kahlbaugh et al. | |
| 5,785,725 | A | 7/1998 | Cusick et al. | |
| 6,165,572 | A | 12/2000 | Kahlbaugh et al. | |
| 6,171,684 | B1 | 1/2001 | Kahlbaugh et al. | |
| 6,521,321 | B2 | 2/2003 | Kahlbaugh et al. | |
| 6,787,230 | B2 | 9/2004 | Kim | |
| 6,872,431 | B2 | 3/2005 | Kahlbaugh et al. | |
| 6,991,702 | B2 | 1/2006 | Kim | |

(Continued)

FOREIGN PATENT DOCUMENTS

| | | |
|---|---|---|
| WO | WO 2008/106490 A1 | 9/2008 |
| WO | WO 2014/137095 A1 | 9/2014 |

(Continued)

OTHER PUBLICATIONS

International Search Report and Written Opinion for PCT/US18/27032 mailed Jul. 3, 2018.

(Continued)

*Primary Examiner* — T. Bennett Mckenzie

(74) *Attorney, Agent, or Firm* — Wolf, Greenfield & Sacks, P.C.

(57) ABSTRACT

Polyethersulfone fiber webs are described.

25 Claims, 1 Drawing Sheet

(56) References Cited

U.S. PATENT DOCUMENTS 7,008,465 B2 3/2006 Graham et al.
7,137,510 B1 11/2006 Klein et al.
7,314,497 B2 1/2008 Kahlbaugh et al.
7,332,050 B2 2/2008 Kim
7,354,546 B2 4/2008 Kim et al.
7,883,562 B2 2/2011 Healey et al.
7,980,838 B2 7/2011 Park
8,197,569 B2 6/2012 Healey et al.
8,202,340 B2 6/2012 Healey et al.
8,222,166 B2 7/2012 Chu et al.
8,257,459 B2 9/2012 Healey et al.
8,523,971 B2 9/2013 Leung et al.
8,714,776 B2 5/2014 Han et al.
8,978,899 B2 3/2015 Ferrer et al.
9,138,669 B2 9/2015 Leung et al.
9,220,998 B2 12/2015 Seo et al.
9,457,325 B2 10/2016 Choi et al.
10,874,962 B2 12/2020 Cox et al.
2001/0003082 A1 6/2001 Kahlbaugh et al.
2003/0167742 A1 9/2003 Kahlbaugh et al.
2004/0112213 A1* 6/2004 Dominiak .......... B01D 53/0446 96/135
2005/0210844 A1 9/2005 Kahlbaugh et al.
2006/0286886 A1* 12/2006 Komura ................ D01D 5/247 442/334
2007/0075015 A1 4/2007 Bates, III et al.
2007/0152378 A1 7/2007 Kim
2008/0070463 A1* 3/2008 Arora .................. H01M 50/494 442/334
2008/0086992 A1 4/2008 Walz
2008/0110342 A1* 5/2008 Ensor .................. D01D 5/0092 425/173
2008/0233284 A1 9/2008 Kim et al.
2008/0277836 A1 11/2008 Park
2009/0032475 A1 2/2009 Ferrer et al.
2009/0189318 A1 7/2009 Kim
2009/0189319 A1 7/2009 Kim
2009/0199717 A1 8/2009 Green et al.
2009/0249956 A1 10/2009 Chi et al.
2010/0107881 A1* 5/2010 Healey .................. B01D 63/14 55/486
2010/0200494 A1* 8/2010 Storer .................. D01D 5/0053 428/401
2010/0252047 A1 10/2010 Kirk et al.
2010/0307119 A1 12/2010 Leung et al.
2011/0114555 A1 5/2011 Coulson et al.
2011/0309014 A1* 12/2011 Hosoya ............. B01D 39/1623 210/500.1
2012/0091072 A1 4/2012 Kozlov et al.
2012/0304602 A1 12/2012 Healey et al.
2013/0092620 A1 4/2013 Weiss et al.
2013/0092622 A1 4/2013 Kas et al.
2013/0197664 A1* 8/2013 Ballard ............. B01D 39/1623 623/23.72
2014/0044756 A1 2/2014 Leung et al.
2014/0076797 A1 3/2014 Jo et al.
2014/0157742 A1 6/2014 Healey et al.
2014/0165517 A1* 6/2014 Hara ........................ B32B 7/12 55/486
2014/0275692 A1 9/2014 Patel et al.
2015/0096444 A1 4/2015 Scheerer et al.
2015/0209691 A1 7/2015 Ferrer et al.
2015/0224453 A1 8/2015 Choi et al.
2015/0298070 A1 10/2015 Koslov et al.
2015/0375150 A1 12/2015 Sahbaee et al.
2016/0047067 A1 2/2016 Park
2016/0060790 A1 3/2016 Park
2016/0083868 A1 3/2016 Park
2016/0175748 A1 6/2016 Park
2016/0175752 A1 6/2016 Jaganathan et al.
2016/0193555 A1 7/2016 Park
2016/0243478 A1 8/2016 Park
2016/0250575 A1 9/2016 Park
2016/0281284 A1* 9/2016 Yoshioka ............... D04H 1/728
2016/0289864 A1 10/2016 Park
2016/0289865 A1 10/2016 Park
2016/0303498 A1 10/2016 Doucouré et al.
2016/0375412 A1 12/2016 Stasiak et al.
2017/0080368 A1 3/2017 Smith et al.
2017/0233913 A1* 8/2017 Shimada ............. H01M 50/409 429/253
2019/0030855 A1 1/2019 Anantharamaiah et al.
2019/0276668 A1 9/2019 Burkholder et al.
2022/0023784 A1 1/2022 Hassounah et al.
2022/0241710 A1 8/2022 Vitchuli et al.

FOREIGN PATENT DOCUMENTS

WO WO 2014/142449 A1 9/2014
WO WO 2014/142450 A1 9/2014
WO WO 2014/142451 A1 9/2014
WO WO 2015/053443 A1 4/2015
WO WO-2016031693 A1 * 3/2016 ............ H01M 50/44
WO WO 2017/032748 A1 3/2017
WO WO 2018/175550 A1 9/2018

OTHER PUBLICATIONS

Homaeigohar, Functional Electrospun Nanofibrous Membranes for Water Filtration. Christian-Albrechts-Universität. Doctoral Dissertation. 2011. 149 pages.

Kwankhao, Microfiltration Membranes via Electrospinning of Polyethersulfone Solutions. Universität Duisburg-Essen. Master of Science Dissertation. 2013. 111 pages.

Lau et al., Phase separation in polysulfone/solvent/water and polyethersulfone/solvent/water systems. Journal of Membrane Science. Jun. 1, 1991;59(2):219-27.

Zhang et al., Effects of Heat Treatment on the Morphology and Performance of PSU Electrospun Nanofibrous Membrane. Journal of Engineered Fibers and Fabrics. Jul. 2012;Special Issue:7-16.

U.S. Appl. No. 16/936,826, filed Jul. 23, 2020, Hassounah et al.

U.S. Appl. No. 17/165,853, filed Feb. 2, 2021, Vitchuli et al.

* cited by examiner

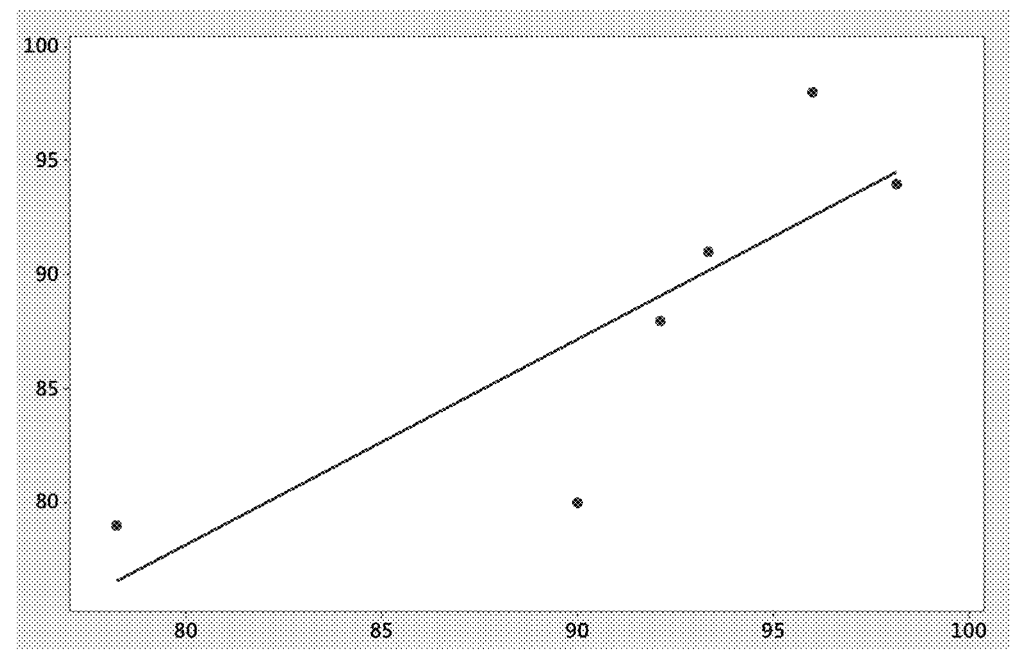
Filtration efficiency for 0.2 micron diameter polystyrene spheres (%)
100
95
90
85
80
80
85
90
95
100
Relative surface area (%)

POLYETHERSULFONE FIBER WEBS

FIELD

The present invention relates generally to fiber webs and, more particularly, to fiber webs comprising polyethersulfone fibers.

BACKGROUND

Filter media can be used to remove contamination in a variety of applications. Depending on the application, the filter media may be designed to have different performance characteristics.

In general, filter media can be formed of a web of fibers. For example, the web may include polyethersulfone fibers amongst other components. The fiber web provides a porous structure that permits fluid to flow through the filter media. Contaminant particles contained within the fluid may be trapped on the fibrous web. Filter media characteristics, such as fiber diameter and basis weight, affect filter performance including filter efficiency, dust holding capacity and resistance to fluid flow through the filter.

Fiber webs formed from polyethersulfone fibers typically contain fibers with large average diameters, fibers with a broad distribution of diameters, and/or contain defects that decrease the surface area of the fiber web.

SUMMARY

Fiber webs comprising polyethersulfone fibers as well as related components and methods associated therewith are provided.

In one set of embodiments, fiber webs are provided. In one embodiment, a fiber web comprises polyethersulfone fibers with an average diameter of less than or equal to 250 nm and has a relative surface area of the fiber web is greater than or equal to 80%.

In some embodiments, a fiber web comprises polyethersulfone fibers with an average diameter of less than or equal to 250 nm, has a surface area of greater than or equal to 75%, and has a measured surface area of greater than or equal to 25 $m^2/g$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying FIGURE. In the FIGURE:

FIG. 1 shows a chart showing a relationship between filtration efficiency for 0.2 micron diameter polystyrene spheres and relative surface area according to some embodiments.

DETAILED DESCRIPTION

Fiber webs as well as related concepts and methods are described herein. In general, the fiber webs comprise polyethersulfone (PES) fibers. The PES fibers may have a low average diameter and a low amount of defects. As described further below, in some embodiments, the fiber web may have a high relative surface area and/or a high measured surface area. The above-noted characteristics may enhance filtration performance of the fiber web by, for example, increasing the filtration efficiency. In certain embodiments, the fiber web may be a filter media or a layer within a filter media. The filter media may be suitable for a filtering fluid, such as air, water and/or oil.

In some embodiments, the fiber web may be formed by an electrospinning process, as will be described in more detail below. As will also be described further below, it should be understood that, optionally, the fiber web may be a layer (e.g., a first layer) in a filter media further comprising additional layers such as a second layer, and/or a third layer, etc.

In some embodiments, a fiber web (e.g., a fiber web within a filter media) may comprise PES in a relatively high amount (e.g., at least about 75 wt % of the fiber web may be PES, at least about 90 wt % of the fiber web may be PES, at least about 95 wt % of the fiber web may be PES, at least about 99 wt % of the fiber web may be PES, or at least about 99.9 wt % of the fiber web may be PES). In some embodiments, the fiber web may comprise PES fibers (i.e., fibers which comprise PES) in a relatively high amount (e.g., PES fibers may make up at least about 75 wt % of the fibers in the fiber web, at least about 90 wt % of the fibers in the fiber web, at least about 95 wt % of the fibers in the fiber web, at least about 99 wt % of the fibers in the fiber web, at least about 99.9 wt % of the fibers in the fiber web, or 100 wt % of the fibers in the fiber web). It should be understood that, as used herein, the terms "PES fiber" and "polyethersulfone fiber" refers to a fiber that comprises at least 50% by weight PES. In some cases, PES fibers may comprise at least about 75 wt % PES, at least about 90 wt % PES, at least about 95 wt % PES, or at least about 99 wt % PES. In some cases, PES fibers are formed entirely of PES. It should be understood that other types of fibers, such as fibers that do not comprise PES and/or fibers that comprise less than 50 wt % PES, may also be present in the PES fiber web.

In some embodiments, the PES fibers within the web may have a low average diameter. In some embodiments, the average diameter of the PES fibers within the fiber web may be less than or equal to about 250 nanometers, less than or equal to about 225 nanometers, less than or equal to about 200 nanometers, less than or equal to about 175 nanometers, less than or equal to about 150 nanometers, less than or equal to about 130 nanometers, less than or equal to about 100 nanometers, less than or equal to about 90 nanometers, or less than or equal to about 50 nanometers. In some embodiments, the average diameter of the PES fibers within the fiber web may be greater than or equal to about 20 nanometers, greater than or equal to about 50 nanometers, greater than or equal to about 90 nanometers, greater than or equal to about 100 nanometers, greater than or equal to about 130 nanometers, greater than or equal to about 150 nanometers, greater than or equal to about 175 nanometers, greater than or equal to about 200 nanometers, or greater than or equal to about 225 nanometers. Combinations of the above-referenced ranges are also possible (e.g., greater than or equal to about 20 nanometers and less than or equal to about 250 nanometers, greater than or equal to about 50 nanometers and less than or equal to about 250 nanometers, greater than or equal to about 90 nanometers and less than or equal to about 130 nanometers). Other ranges are also possible. In general, individual fiber diameters may be measured by microscopy, for example scanning electron microscopy (SEM), and statistics regarding fiber diameter such as average fiber diameter, and fiber diameter standard deviation may be determined by performing appropriate statistical techniques on the measured fiber diameters.

In some embodiments, the PES fibers within the web may have a relatively tight fiber diameter distribution. In some embodiments, the standard deviation of the PES fiber diameters is less than or equal to about 75 nanometers, less than or equal to about 60 nanometers, less than or equal to about 50 nanometers, less than or equal to about 40 nanometers, less than or equal to about 30 nanometers, less than or equal to about 25 nanometers, or less than or equal to about 10 nanometers. In some embodiments, the standard deviation of the PES fiber diameters is greater than or equal to about 10 nanometers, greater than or equal to about 20 nanometers, greater than or equal to about 25 nanometers, greater than or equal to about 30 nanometers, greater than or equal to about 40 nanometers, greater than or equal to about 50 nanometers, greater than or equal to about 60 nanometers, or greater than or equal to about 70 nanometers. Combinations of the above-referenced ranges are also possible (e.g., greater than or equal to about 20 nanometers and less than or equal to about 75 nanometers, or greater than or equal to about 25 nanometers and less than or equal to about 50 nanometers). Other ranges are also possible.

In general, the PES within the fibers may have any suitable weight average molecular weight. For example, the PES may have a weight average molecular weight of greater than or equal to about 25 kg/mol, greater than or equal to about 45 kg/mol, greater than or equal to about 60 kg/mol, greater than or equal to about 80 kg/mol, greater than or equal to about 100 kg/mol, or greater than or equal to about 125 kg/mol. The PES may have a weight average molecular weight of less than or equal to about 150 kg/mol, less than or equal to about 125 kg/mol, less than or equal to about 100 kg/mol, less than or equal to about 80 kg/mol, less than or equal to about 60 kg/mol, or less than or equal to about 45 kg/mol. Combinations of the above-referenced ranges are also possible (e.g., greater than or equal to about 25 kg/mol and less than or equal to about 150 kg/mol, or greater than or equal to about 45 kg/mol and less than or equal to about 80 kg/mol). Other ranges are also possible. The weight average molecular weight of the PES may be measured by conventional gel permeation chromatography techniques.

In some embodiments, the PES fiber webs as described herein may have one or more advantageous properties (e.g., a high measured surface area, a high relative surface area, a high filtration efficiency). It should be understood that any properties of a fiber web described herein may refer to the properties of the fiber web absent any surface treatments post fabrication, or may refer to the properties of a fiber web that has undergone one or more surface treatments (as will be described in further detail below).

In some embodiments, it may be preferred for the PES fiber web to have a relatively high measured surface area. For example, the measured surface area of the fiber web may be greater than or equal to about 19 $m^2/g$, greater than or equal to about 22 $m^2/g$, greater than or equal to about 25 $m^2/g$, greater than or equal to about 35 $m^2/g$, greater than or equal to about 40 $m^2/g$, greater than or equal to about 55 $m^2/g$, greater than or equal to about 75 $m^2/g$, greater than or equal to about 95 $m^2/g$, greater than or equal to about 115 $m^2/g$, greater than or equal to about 135 $m^2/g$, or greater than or equal to about 155 $m^2/g$. In some embodiments, the measured surface area of the fiber web may be less than or equal to about 200 $m^2/g$, less than or equal to about 155 $m^2/g$, less than or equal to about 135 $m^2/g$, less than or equal to about 115 $m^2/g$, less than or equal to about 95 $m^2/g$, less than or equal to about 75 $m^2/g$, less than or equal to about 55 $m^2/g$, less than or equal to about 40 $m^2/g$, less than or equal to about 35 $m^2/g$, less than or equal to about 25 $m^2/g$, or less than or equal to about 22 $m^2/g$. Combinations of the above-referenced ranges are also possible (e.g., greater than or equal to about 19 $m^2/g$ and less than or equal to about 200 $m^2/g$, greater than or equal to about 55 $m^2/g$ and less than or equal to about 200 $m^2/g$, greater than or equal to about 95 $m^2/g$ and less than or equal to about 200 $m^2/g$, greater than or equal to about 155 $m^2/g$ and less than or equal to about 200 $m^2/g$, greater than or equal to about 19 $m^2/g$ and less than or equal to about 40 $m^2/g$, or greater than or equal to about 22 $m^2/g$ and less than or equal to about 35 $m^2/g$). Other ranges are also possible.

The measured surface area is measured through use of a standard BET surface area measurement technique. The BET surface area is measured according to section 10 of Battery Council International Standard BCIS-03A (2009), "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

The PES fiber web may also be characterized by a theoretical surface area. As used herein, the theoretical surface area is defined by the following equation:

$$SA_{theoretical} = \frac{4}{\rho} * \text{average}\left(\frac{1}{D}\right)$$

where $SA_{theoretical}$ refers to the theoretical surface area, p refers to the density of the polymer(s) forming the fibers (e.g., the density of PES for PES fibers (1.37 $g/cm^3$ for PES fibers that are 100 wt % PES)), and average (1/D) refers to the inverse of the harmonic mean of the diameters of the fibers forming the web. In some embodiments, the theoretical surface area of the PES fiber web is greater than or equal to about 19 $m^2/g$, greater than or equal to about 22 $m^2/g$, greater than or equal to about 25 $m^2/g$, greater than or equal to about 35 $m^2/g$, greater than or equal to about 40 $m^2/g$, greater than or equal to about 55 $m^2/g$, greater than or equal to about 75 $m^2/g$, greater than or equal to about 95 $m^2/g$, greater than or equal to about 115 $m^2/g$, greater than or equal to about 135 $m^2/g$, greater than or equal to about 155 $m^2/g$, greater than or equal to about 175 $m^2/g$, greater than or equal to about 200 $m^2/g$, greater than or equal to about 225 $m^2/g$, greater than or equal to about 250 $m^2/g$, or greater than or equal to about 275 $m^2/g$. The theoretical surface area of the fiber web may be less than or equal to about 300 $m^2/g$, less than or equal to about 275 $m^2/g$, less than or equal to about 250 $m^2/g$, less than or equal to about 225 $m^2/g$, less than or equal to about 200 $m^2/g$, less than or equal to about 155 $m^2/g$, less than or equal to about 135 $m^2/g$, less than or equal to about 115 $m^2/g$, less than or equal to about 95 $m^2/g$, less than or equal to about 75 $m^2/g$, less than or equal to about 55 $m^2/g$, less than or equal to about 40 $m^2/g$, less than or equal to about 35 $m^2/g$, less than or equal to about 25 $m^2/g$, or less than or equal to about 22 $m^2/g$. Combinations of the above-referenced ranges are also possible (e.g., greater than or equal to about 19 $m^2/g$ and less than or equal to about 200 $m^2/g$, greater than or equal to about 55 $m^2/g$ and less than or equal to about 200 $m^2/g$, greater than or equal to about 95 $m^2/g$ and less than or equal to about 200 $m^2/g$, greater than or equal to about 155 $m^2/g$ and less than or equal to about 200 $m^2/g$, greater than or equal to about 19 $m^2/g$ and less than or equal to about 40 $m^2/g$, or greater than or equal to about 22 $m^2/g$ and less than or equal to about 35 $m^2/g$). Other ranges are also possible.

In some embodiments, the PES fiber web may have a high relative surface area. As used herein, the relative surface area of a fiber web refers to 100% times the ratio of the measured surface area of the fiber web (having fibers with a density and an average diameter) as described above to the theoretical surface area for a fiber web comprising fibers of the same density and average diameter. In some embodiments, a fiber web may have a relative surface area of greater than or equal to about 65%, greater than or equal to about 70%, greater than or equal to about 75%, greater than or equal to about 80%, greater than or equal to about 85%, greater than or equal to about 90%, or greater than or equal to about 95%. In some embodiments, a fiber web may have a relative surface area of less than or equal to about 100%, less than or equal to about 95%, less than or equal to about 90%, less than or equal to about 85%, less than or equal to about 80%, less than or equal to about 75%, or less than or equal to about 70%. Combinations of the above-referenced ranges are also possible (e.g., greater than or equal to about 65% and less than or equal to about 100%, or greater than or equal to about 80% and less than or equal to about 100%). Other ranges are also possible.

Without wishing to be bound by theory, it is believed that fiber webs having a high relative surface area (e.g., close to about 100%) contain few defects such as beads. As used herein, beads are portions of the fiber web which have a width greater than 10 times the average fiber diameter of the fibers within the fiber web and which have an aspect ratio of less than 50. In some embodiments, it may be advantageous for a fiber web to have a relatively low number of beads. A fiber web with a relatively low number of beads may have an improved filtration efficiency compared to an otherwise equivalent fiber web which includes a higher number of beads. In some cases, a fiber may have a relative surface area within or outside the ranges described above, and may have a low concentration of beads. For example, the fiber web may have fewer than 40,000 beads per $mm^2$, fewer than 10,000 beads per $mm^2$, fewer than 5,000 beads per $mm^2$, or fewer than 300 beads per $mm^2$. The number beads per $mm^2$ may be determined by microscopy.

The PES fiber web may have any suitable basis weight. In some embodiments, the fiber web may have a basis weight of greater than or equal to about 0.05 $g/m^2$, greater than or equal to about 0.1 $g/m^2$, greater than or equal to about 0.2 $g/m^2$, greater than or equal to about 0.5 $g/m^2$, greater than or equal to about 1 $g/m^2$, or greater than or equal to about 2 $g/m^2$, greater than or equal to about 3 $g/m^2$, greater than or equal to about 5 $g/m^2$, greater than or equal to about 10 $g/m^2$, or greater than or equal to about 15 $g/m^2$. In some embodiments, the fiber web may have a basis weight of less than or equal to about 30 $g/m^2$, less than or equal to about 25 $g/m^2$, less than or equal to about 15 $g/m^2$, less than or equal to about 10 $g/m^2$, less than or equal to about 5 $g/m^2$, less than or equal to about 3 $g/m^2$, less than or equal to about 2 $g/m^2$, less than or equal to about 1 $g/m^2$, less than or equal to about 0.5 $g/m^2$, less than or equal to about 0.2 $g/m^2$, or less than or equal to about 0.1 $g/m^2$. Combinations of the above-referenced ranges are also possible (e.g., greater than or equal to about 0.5 $g/m^2$ and less than or equal to about 30 $g/m^2$, greater than or equal to about 2 $g/m^2$ and less than or equal to about 25 $g/m^2$, greater than or equal to about 3 $g/m^2$ and less than or equal to about 15 $g/m^2$, greater than or equal to about 0.05 $g/m^2$ and less than or equal to about 1 $g/m^2$, greater than or equal to about 0.1 $g/m^2$ and less than or equal to about 0.5 $g/m^2$, greater than or equal to about 0.05 $g/m^2$ and less than or equal to about 5 $g/m^2$, or greater than or equal to about 0.5 $g/m^2$ and less than or equal to about 2 $g/m^2$). Other ranges are also possible. The basis weight of a fiber web may be determined according to the standard ISO 536:2012. In embodiments in which the fiber web is supported on a substrate or is one layer within a fiber web, the basis weight of the fiber web may be measured by determining the basis weight of the substrate or the filter media absent the fiber web, determining the basis weight of the substrate and the fiber web or of the filter media including the fiber web, and taking the difference between these two values.

The PES fiber web may have any suitable thickness. In some embodiments, the thickness of the PES fiber web is greater than or equal to about 20 nanometers, greater than or equal to about 50 nanometers, greater than or equal to about 90 nanometers, greater than or equal to about 100 nanometers, greater than or equal to about 130 nanometers, greater than or equal to about 150 nanometers, greater than or equal to about 175 nanometers, greater than or equal to about 200 nanometers, greater than or equal to about 225 nanometers, greater than or equal to 500 nanometers, greater than or equal to about 1 micron, greater than or equal to about 2.5 microns, greater than or equal to about 5 microns, greater than or equal to about 7.5 microns, greater than or equal to about 10 microns, greater than or equal to about 12.5 microns, greater than or equal to about 15 microns, or greater than or equal to about 17.5 microns. In some embodiments, the thickness of the PES fiber web is less than or equal to about 20 microns, less than or equal to about 17.5 microns, less than or equal to about 15 microns, less than or equal to about 12.5 microns, less than or equal to about 10 microns, less than or equal to about 7.5 microns, less than or equal to about 5 microns, less than or equal to about 2.5 microns, less than or equal to about 1 micron, less than or equal to about 500 nanometers, less than or equal to about 225 nanometers, less than or equal to about 200 nanometers, less than or equal to about 175 nanometers, less than or equal to about 150 nanometers, less than or equal to about 130 nanometers, less than or equal to about 100 nanometers, less than or equal to about 90 nanometers, or less than or equal to about 50 nanometers. Combinations of the above-referenced ranges are also possible (e.g., greater than or equal to about 20 nanometers and less than or equal to about 20 microns, or greater than or equal to about 5 microns and less than or equal to about 20 microns). Other ranges are also possible. The thickness of the layer may be determined by using cross-sectional SEM imaging.

The PES fiber web may have any suitable mean flow pore size. In some embodiments, the fiber web has a mean flow pore size of greater than or equal to about 0.05 microns, greater than or equal to about 0.1 micron, greater than or equal to about 0.2 microns, greater than or equal to about 0.5 microns, greater than or equal to about 1 micron, greater than or equal to about 2 microns, greater than or equal to about 4 microns, greater than or equal to about 5 microns, greater than or equal to about 8 microns, or greater than or equal to about 10 microns. In some embodiments, the fiber web has a mean flow pore size of less than or equal to about 20 microns, less than or equal to about 10 microns, less than or equal to about 8 microns, less than or equal to about 5 microns, less than or equal to about 4 microns, less than or equal to about 2 microns, less than or equal to about 1 micron, less than or equal to about 0.5 microns, or less than or equal to about 0.2 microns. Combinations of the above-referenced ranges are also possible (e.g., greater than or equal to about 0.05 microns and less than or equal to about 4 microns, greater than or equal to about 0.1 microns and less than or equal to about 4 microns, greater than or equal to about 0.1 microns and less than or equal to about 2 microns, greater than or equal to about 0.2 microns and less than or equal to about 2 microns, greater than or equal to about 2 microns and less than or equal to about 20 microns, greater than or equal to about 8 microns and less than or equal to about 10 microns, greater than or equal to about 1 micron and less than or equal to about 10 microns, or greater than or equal to about 2 microns and less than or equal to about 5 microns). Other ranges are also possible. The mean flow pore size may be determined according to ASTM F316 (2003).

In certain embodiments, the PES fiber web may have a relatively low maximum pore size. In some embodiments, the maximum pore size of the fiber web may be less than or equal to about 80 microns, less than or equal to about 70 microns, less than or equal to about 60 microns, less than or equal to about 50 microns, less than or equal to about 40 microns, less than or equal to about 30 microns, less than or equal to about 20 microns, less than or equal to about 10 microns, less than or equal to about 5 microns, less than or equal to about 2 microns, less than or equal to about 1 micron, less than or equal to about 0.5 microns, less than or equal to about 0.2 microns, less than or equal to about 0.1 micron, or less than or equal to about 0.8 microns. In some embodiments, the maximum pore size of the fiber web may be greater than or equal to about 0.06 microns, greater than or equal to about 0.08 microns, greater than or equal to about 0.1 micron, greater than or equal to about 0.2 microns, greater than or equal to about 0.5 microns, greater than or equal to about 1 micron, greater than or equal to about 2 microns, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. Combinations of the above-referenced ranges are also possible (e.g., greater than or equal to about 0.06 microns and less than or equal to about 80 microns, greater than or equal to about 0.08 microns and less than or equal to about 50 microns). Other ranges are also possible. The maximum pore size may be determined according to ASTM F316 (2003).

In some embodiments, the PES fiber web may have a relatively low ratio of maximum pore size to mean flow pore size. The ratio of the maximum pore size to the mean flow pore size may be less than or equal to about 4.0, less than or equal to about 3.8, less than or equal to about 3.6, less than or equal to about 3.4, less than or equal to about 3.2, less than or equal to about 3.0, less than or equal to about 2.8, less than or equal to about 2.6, less than or equal to about 2.4, less than or equal to about 2.2, less than or equal to about 2.0, less than or equal to about 1.8, less than or equal to about 1.6, or less than or equal to about 1.4. In some embodiments, the ratio of the maximum pore size to the mean flow pore size may be greater than or equal to about 1.2, greater than or equal to about 1.4, greater than or equal to about 1.6, greater than or equal to about 1.8, greater than or equal to about 2.0, greater than or equal to about 2.2, greater than or equal to about 2.4, greater than or equal to about 2.8, greater than or equal to about 3.0, greater than or equal to about 3.2, greater than or equal to about 3.4, greater than or equal to about 3.6, or greater than or equal to about 3.8. Combinations of the above-referenced ranges are also possible (e.g., less than or equal to about 4.0 and greater than or equal to about 1.2, less than or equal to about 2.6 and greater than or equal to about 1.6). Other ranges are also possible The PES fiber web may have any suitable air permeability. In some embodiments, the fiber web has an air permeability under a pressure of 0.5 inches of water of greater than or equal to about 0.2 CFM, greater than or equal to about 0.3 CFM, greater than or equal to about 0.5 CFM, greater than or equal to about 1 CFM, greater than or equal to about 1.7 CFM, greater than or equal to about 5 CFM, greater than or equal to about 10 CFM, greater than or equal to about 20 CFM, or greater than or equal to about 30 CFM. In some embodiments, the fiber web has an air permeability under a pressure of 0.5 inches of water of less than or equal to about 40 CFM, less than or equal to about 30 CFM, less than or equal to about 20 CFM, less than or equal to about 10 CFM, less than or equal to about 5 CFM, less than or equal to about 1.7 CFM, less than or equal to about 1 CFM, less than or equal to about 0.5 CFM, or less than or equal to about 0.3 CFM. Combinations of the above-referenced ranges are also possible (e.g., greater than or equal to about 0.2 CFM and less than or equal to about 5 CFM, greater than or equal to about 0.3 CFM and less than or equal to about 1.7 CFM, greater than or equal to about 5 CFM and less than or equal to about 40 CFM, or greater than or equal to about 10 CFM and less than or equal to about 30 CFM). Other ranges are also possible. The air permeability may be measured by ASTM D737-04 (2016) at a pressure of 0.5 inches of water.

In some embodiments, the PES fiber web has an air permeability under a pressure of 10 inches of water of greater than or equal to about 0.5 CFM, greater than or equal to about 1 CFM, greater than or equal to about 2 CFM, greater than or equal to about 5 CFM, greater than or equal to about 10 CFM, or greater than or equal to about 20 CFM. In some embodiments, the fiber web has an air permeability under a pressure of 10 inches of water of less than or equal to about 50 CFM, less than or equal to about 20 CFM, less than or equal to about 10 CFM, less than or equal to about 5 CFM, less than or equal to about 2 CFM, or less than or equal to about 1 CFM. Combinations of the above-referenced ranges are also possible (e.g., greater than or equal to about 0.5 CFM and less than or equal to about 50 CFM, or greater than or equal to about 1 CFM and less than or equal to about 20 CFM). Other ranges are also possible. The air permeability may be measured by ASTM D737-04 (2016) at a pressure of 10 inches of water.

The PES fiber web may have any suitable water permeability. In some embodiments, the water permeability of the fiber web is greater than or equal to about 0.1 mL/(min*cm$^2$*psi), greater than or equal to about 0.2 mL/(min*cm$^2$*psi), greater than or equal to about 0.5 mL/(min*cm$^2$*psi), greater than or equal to about 1 mL/(min*cm$^2$*psi), greater than or equal to about 1.5 mL/(min*cm$^2$*psi), greater than or equal to about 2 mL/(min*cm$^2$*psi), greater than or equal to about 5 mL/(min*cm$^2$*psi), or greater than or equal to about 8 mL/(min*cm$^2$*psi). In some embodiments, the water permeability of the fiber web is less than or equal to about 10 mL/(min*cm$^2$*psi), less than or equal to about 8 mL/(min*cm$^2$*psi), less than or equal to about 5 mL/

(min*cm$^2$*psi), less than or equal to about 2 mL/(min*cm$^2$*psi), less than or equal to about 1.5 mL/(min*cm$^2$*psi), less than or equal to about 1 mL/(min*cm$^2$*psi), less than or equal to about 0.5 mL/(min*cm$^2$*psi), or less than or equal to about 0.2 mL/(min*cm$^2$*psi). Combinations of the above-referenced ranges are also possible (e.g., greater than or equal to about 0.1 mL/(min*cm$^2$*psi) and less than or equal to about 10 mL/(min*cm$^2$*psi), greater than or equal to about 0.5 mL/(min*cm$^2$*psi) and less than or equal to about 10 mL/(min*cm$^2$*psi), greater than or equal to about 1 mL/(min*cm$^2$*psi) and less than or equal to about 8 mL/(min*cm$^2$*psi), or greater than or equal to about 1.5 mL/(min*cm$^2$*psi) and less than or equal to about 5 mL/(min*cm$^2$*psi)). Other ranges are also possible. The water permeability may be measured by exposing a fiber web with an area of 4.8 cm$^2$ to deionized water at a constant pressure of 20 psi and collecting the water that flows through the fiber web. The time required for 1000 mL of water to flow through the fiber web is determined, and then the water permeability is determined using the following formula:

$$\text{Water permeability} = \frac{1000\ \text{mL}}{\text{measured time in minutes} * 4.8\ \text{cm}^2 * 20psi}.$$

Prior to exposing the fiber web to the deionized water, the fiber web is first immersed in isopropanol and then in deionized water.

In some embodiments, the PES fiber web may have a relatively high filtration efficiency for various species. In some embodiments, a fiber web may have an initial filtration efficiency for 4 micron diameter particles of greater than or equal to about 80%, greater than or equal to about 85%, greater than or equal to about 90%, greater than or equal to about 95%, greater than or equal to about 97%, or greater than or equal to about 99%. In some embodiments, a fiber web may have an initial filtration efficiency for 4 micron diameter particles of less than or equal to about 100%, less than or equal to about 99%, less than or equal to about 97%, less than or equal to about 95%, less than or equal to about 90%, or less than or equal to about 85%. Combinations of the above-referenced ranges are also possible (e.g., greater than or equal to about 80% and less than or equal to about 100%, or greater than or equal to about 95% and less than or equal to about 100%). Other ranges are also possible. The initial filtration efficiency for 4 micron diameter particles may be determined in accordance with the ISO 19438:2003 (E) fuel test standard, where ISO Medium Test Dust (ISO 12103-A3) is employed as the test species.

In some embodiments, the PES fiber web may have a filtration efficiency for 0.2 micron diameter polystyrene spheres of greater than or equal to about 75%, greater than or equal to about 80%, greater than or equal to about 85%, greater than or equal to about 90%, greater than or equal to about 95%, greater than or equal to about 97%, or greater than or equal to about 99%. In some embodiments, a fiber web may have a filtration efficiency for 0.2 micron diameter polystyrene spheres of less than or equal to about 100%, less than or equal to about 99%, less than or equal to about 97%, less than or equal to about 95%, less than or equal to about 90%, less than or equal to about 85%, or less than or equal to about 80%. Combinations of the above-referenced ranges are also possible (e.g., greater than or equal to about 75% and less than or equal to about 100%, or greater than or equal to about 90% and less than or equal to about 100%). Other ranges are also possible. The filtration efficiency of a filter media for 0.2 micron diameter polystyrene spheres may be determined by placing a 43 mm diameter disk of the fiber web in a stirred cell (e.g., model UHP 43 70ML, Sterlitech) and exposing it to a 5 ppm suspension in water of polystyrene spheres with an average diameter of 0.2 microns, a diameter range of 0.02-20 microns, and a coefficient of variation of between 5% and 10%. The suspension is stirred such that a vortex is formed that is about 25% of the total solution height, and passed through the fiber web under the influence of gravity until 50 mL of the solution has crossed the fiber web. The ratio of the turbidity of the suspension after passing through the fiber web to the turbidity of the suspension prior to passing through the fiber web may be determined and multiplied by 100% to yield the filtration efficiency. Turbidity can be measured with a nephelometer or a turbidimeter, which detects the amount of light scattered by the small particles when they are exposed to a light beam. An example of a turbidimeter that can be used to measure turbidity is model Micro TPI/TPW, manufactured by HF Scientific, Inc. This meter is built to meet design criteria specified in EN-ISO 7027:1999 (Section 6.2.4) and ASTM D1889:1994 and satisfy criteria specified in Standard US EPA 180.1 on turbidity measurements.

In some embodiments, the PES fiber web may have an initial penetration for 0.3 micron diameter dioctyl phthalate (DOP) particles of less than or equal to about 40%, less than or equal to about 30%, less than or equal to about 20%, less than or equal to about 10%, less than or equal to about 5%, or less than or equal to about 2%. In some embodiments, a fiber web may have an initial penetration for 0.3 micron diameter DOP particles of greater than or equal to about 1%, greater than or equal to about 2%, greater than or equal to about 5%, greater than or equal to about 10%, greater than or equal to about 20%, or greater than or equal to about 30%. Combinations of the above-referenced ranges are also possible (e.g., greater than or equal to about 1% and less than or equal to about 40%, or greater than or equal to about 10% and less than or equal to about 20%). Other ranges are also possible. The initial penetration for 0.3 micron DOP particles may be measured by blowing 0.3 micron diameter DOP particles through the fiber web at a face velocity of 5.33 cm/s and measuring the percentage of particles that penetrate through the fiber web. Penetration of 0.3 micron diameter DOP particles may be measured by an ATI model 100P aerosol tester, in accordance with MIL-STD-282 (1956).

In some embodiments, a fiber web may be designed for sterile filtration. In some such embodiments, the particulate efficiency for microorganisms may be very high (e.g., greater than or equal to about 99.999%). In some embodiments, the particulate efficiency of the filter media for microorganisms may be expressed in terms of Log Reduction Value (i.e., LRV), which is a quantitative measure of microorganism retention by a fiber web. LRV is the logarithm of Pentration$^{-1}$ and is expressed as follows:

LRV=Log {[CFU]challenge/[CFU]effluent]} wherein [CFU]challenge is the number of bacteria in colony forming units in the fluid before passage through the fiber web and [CFU]effluent is the total number of bacteria in colony forming units in the fluid after passage through the fiber web.

LRV may be determined using ASTM F838-05 (2015). If the [CFU]effluent is zero, one is used in the above equation to calculate LRV. Briefly, *Brevundimonas diminuta* at a concentration of $10^7$ CFU/1 cm$^2$ for a 76 cm$^2$ sample area may be used as the challenge. Therefore, the [CFU]challenge is $7.6\times10^{8}$. An LRV of greater than 8.88 is considered sterile. In some embodiments, the filter media may have an LRV of greater than or equal to about 3, greater than or equal to about 4, greater than or equal to about 5, greater than or equal to about 6, greater than or equal to about 7, greater than or equal to about 8, or greater than or equal to about 8.88. In some embodiments, the filter media may have an LRV of less than or equal to about 8.881, less than or equal to about 8.88, less than or equal to about 8, less than or equal to about 7, less than or equal to about 6, less than or equal to about 5, or less than or equal to about 4. Combinations of the above-referenced ranges are also possible (e.g., greater than or equal to about 3 and less than or equal to about 8.881). Other ranges are also possible.

In some embodiments, the PES fiber web may have a relatively high BSA throughput. The BSA throughput may be greater than or equal to 1000 L/m$^2$, greater than or equal to 1500 L/m$^2$, greater than or equal to 2000 L/m$^2$, or greater than or equal to 2500 L/m$^2$. The BSA throughput may be less than or equal to 3000 L/m$^2$, less than or equal to 2500 L/m$^2$, less than or equal to 2000 L/m$^2$, or less than or equal to 1500 L/m$^2$. Combinations of the above-referenced ranges are also possible (e.g., greater than or equal to 1000 L/m$^2$ and less than or equal to 3000 L/m$^2$). Other ranges are also possible. BSA throughput may be measured by passing a freshly prepared solution of 10-50 mg of BSA dissolved in 1 L of phosphate buffered saline through a fiber web with an effective area of 4.8 cm$^2$ at a pressure of 3-30 psi and collecting the filtrate. The measurement concludes when the filtrate ceases to be collected. The following equation may then be evaluated:

$$BSA\ \text{throughput} = \frac{\text{Volume of filtrate}}{\text{Fiber web effetive area}}.$$

In some embodiments, the PES fiber web may be relatively resistant to abrasion. For instance, routine handling of the fiber web, routine winding and unwinding of the fiber web, exposure to liquid test environments, and/or exposure to pressure may not result in observable abrasion of the fiber web.

As described above, in certain embodiments the PES fiber web may be a layer of a filter media that further comprises one or more additional layers. (e.g., a second layer, a third layer, a fourth layer, a fifth layer, and the like) In some embodiments, a filter media may comprise at least two layers that are PES fiber webs. For example, a filter media may comprise a second PES fiber web that has a similar average fiber diameter to a first PES fiber web, or may comprise a second PES fiber web which includes coarser fibers than the fibers in the first PES fiber web.

In some embodiments, the PES fiber web may be a layer of a filter media that comprises one or more support layers. The support layer or layers may be used to support the PES fiber web. For example, the support layer may be a substrate on which the PES fiber web is supported. In some cases, the support layer or layers may be used to protect and/or cover the PES fiber web, shape the PES fiber web, enhance the filtration efficiency of the filter media, and/or increase the amount of contaminant that the filter media can absorb. Properties of support layers will be described in further detail below.

References herein to a support layer or layers should be understood to refer to each support layer in the filter media independently (if any support layers are present at all). That is, each support layer that is present may independently have any or none of the properties described below. In some embodiments, two or more support layers in the filter media may have similar compositions and/or properties. In other embodiments, each support layer in the filter media may have different compositions and/or properties.

In some embodiments that comprise at least one support layer, the support layer or layers may be wetlaid layers. That is, in some embodiments the support layer or layers may be formed by a wetlaid process. In other embodiments, the support layer or layers may be non-wetlaid layers. That is, in some embodiments the support layer or layers may be formed by a non-wet laid process (e.g., an air laid process, a carding process, a meltblown process, a spinning process (e.g., a spunbond process)). In some embodiments, the support layer or layers may be meltdown layers, or layers formed by a meltblown process. In some such embodiments, a filter media may comprise a PES fiber web positioned between two support layers that are meltblown layers.

In some embodiments of filter media that comprises at least one support layer, the support layer or layers may comprise synthetic fibers, glass fibers, and/or cellulose fibers, amongst other fiber types. For example, the support layer or layers may comprise synthetic fibers formed from a meltblown process, melt spinning process, centrifugal spinning process, electrospinning, wet laid, dry laid, or air laid process. In some instances, the synthetic fibers may be continuous. In some embodiments, the filter media may comprise at least one support layer that includes glass fibers (e.g., microglass fibers, chopped strand glass fibers, or a combination thereof).

In some embodiments, the filter media may comprise one or more support layers and the support layer or layers may comprise synthetic fibers. The synthetic fibers may include any suitable type of synthetic polymer. Examples of suitable synthetic fibers include polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). In some embodiments, synthetic fibers may be staple fibers (e.g., wetlaid staple fibers, air laid staple fibers). The filter media, as well as each of the layers within the filter media, may also include combinations of more than one type of synthetic fiber. It should be understood that other types of synthetic fibers may also be used.

In some embodiments, it may be preferred for a support layer or layers to be capable of being bonded to the PES fiber web by one or more of compression, chemical adhesion, solvent-induced partial fiber dissolution, and/or softening. For example, support layer(s) which comprise one or more polyester fibers may be suitable for this purpose.

In some embodiments, the filter media may comprise at least one support layer, and the support layer or layers may comprise fibers. In some embodiments, the support layer or layers may comprise fibers with an average diameter of greater than or equal to about 0.1 micron, greater than or equal to about 0.2 microns, greater than or equal to about 0.5 microns, greater than or equal to about 1 micron, greater than or equal to about 1.5 microns, greater than or equal to about 2.5 microns, greater than or equal to about 4 microns, greater than or equal to about 7 microns, greater than or equal to about 10 microns, greater than or equal to about 15 microns, greater than or equal to about 17 microns, greater than or equal to about 20 microns, greater than or equal to about 25 microns, greater than or equal to about 30 microns, greater than or equal to about 35 microns, greater than or equal to about 40 microns, greater than or equal to about 45 microns, greater than or equal to about 50 microns, or greater than or equal to about 55 microns. In some embodiments, the support layer or layers may comprise fibers with an average diameter of less than or equal to about 60 microns, less than or equal to about 55 microns, less than or equal to about 50 microns, less than or equal to about 45 microns, less than or equal to about 40 microns, less than or equal to about 35 microns, less than or equal to about 30 microns, less than or equal to about 25 microns, less than or equal to about 20 microns, less than or equal to about 17 microns, less than or equal to about 15 microns, less than or equal to about 10 microns, less than or equal to about 7 microns, less than or equal to about 4 microns, less than or equal to about 2.5 microns, less than or equal to about 1.5 microns, less than or equal to about 1 micron, less than or equal to about 0.5 microns, or less than or equal to about 0.2 microns. Combinations of the above-referenced ranges are also possible (e.g., greater than or equal to about 0.1 micron and less than or equal to about 60 microns, greater than or equal to about 1 micron and less than or equal to about 20 microns, greater than or equal to about 1.5 microns and less than or equal to about 10 microns, greater than or equal to 4 microns and less than or equal to 60 microns, greater than or equal to 7 microns and less than or equal to 40 microns, greater than or equal to 10 microns and less than or equal to 60 microns, or greater than or equal to 17 and less than or equal to 35 microns). Other ranges are also possible.

In embodiments in which the filter media comprises at least one support and the support layer or layers comprise fibers, the average length of the fibers in the support layer or layers may be any suitable value. In some embodiments, the average length of the fibers in the support layer or layers is greater than or equal to 3 mm, greater than or equal to 6 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1000 mm, greater than or equal to 2000 mm, greater than or equal to 5000 mm, greater than or equal to 10000 mm, greater than or equal to 25400 mm, greater than or equal to 50000 mm, or greater than or equal to 100000 mm. In some embodiments, the average length of the fibers in the support layer or layers is less than or equal to 200000 mm, less than or equal to 100000 mm, less than or equal to 50000 mm, less than or equal to 25400 mm, less than or equal to 20000 mm, less than or equal to 10000 mm, less than or equal to 5000 mm, less than or equal to 2000 mm, less than or equal to 1000 mm, less than or equal to 500 mm, less than or equal to 200 mm, less than or equal to 100 mm, less than or equal to 50 mm, less than or equal to 20 mm, or less than or equal to 10 mm, less than or equal to 6 mm. Combinations of the above-referenced ranges are also possible (e.g., greater than or equal to 3 mm and less than or equal to 200000 mm, greater than or equal to 3 mm and less than or equal to 25400 mm, or greater than or equal to 6 and less than or equal to 25400 mm). Other ranges are also possible. In some embodiments, the fibers are continuous fibers. In other embodiments, the fibers are non-continuous fibers (e.g., staple fibers).

In some embodiments where the filter media comprises at least one support layer, the support layer or layers may have a thickness of greater than or equal to 0.02 mm, greater than or equal to 0.05 mm, greater than or equal to 0.1 mm, greater than or equal to 0.25 mm, greater than or equal to 0.38 mm, greater than or equal to 0.5 mm, greater than or equal to 1 mm, greater than or equal to 2 mm, or greater than or equal to 3 mm. In some embodiments, the support layer or layers (e.g., a first layer, a third layer, a fifth layer) may have a thickness of less than or equal to 5 mm, less than or equal to 3 mm, less than or equal to 2 mm, less than or equal to 1 mm, less than or equal to 0.5 mm, less than or equal to 0.38 mm, less than or equal to 0.25 mm, less than or equal to 0.1 mm, or less than or equal to 0.05 mm). Combinations of the above-referenced ranges are also possible (e.g., greater than or equal to 0.02 mm and less than or equal to 5 mm, greater than or equal to 0.25 mm and less than or equal to 2 mm, greater than or equal to 0.38 and less than or equal to 1 mm, greater than or equal to 0.05 mm and less than or equal to 5 mm, or greater than or equal to 0.1 mm and less than or equal to 3 mm). Other ranges are also possible. The thickness of the support layer or layers may be determined according to the standard ISO 534:2011 at 50 kPa.

In embodiments where the filter media comprises at least one support layer, the support layer or layers may have any suitable basis weight. In some embodiments, the support layer or layers may have a basis weight of greater than or equal to 10 g/m$^2$, greater than or equal to 20 g/m$^2$, greater than or equal to 35 g/m$^2$, greater than or equal to 40 g/m$^2$, greater than or equal to 80 g/m$^2$, greater than or equal to 120 g/m$^2$, greater than or equal to 150 g/m$^2$, greater than or equal to 200 g/m$^2$, or greater than or equal to 250 g/m$^2$. In some embodiments, the support layer or layers may have a basis weight of less than or equal to 300 g/m$^2$, less than or equal to 250 g/m$^2$, less than or equal to 200 g/m$^2$, less than or equal to 150 g/m$^2$, less than or equal to 120 g/m$^2$, less than or equal to 80 g/m$^2$, less than or equal to 40 g/m$^2$, less than or equal to 35 g/m$^2$, or less than or equal to 20 g/m$^2$. Combinations of the above-referenced ranges are also possible (e.g., greater than or equal to 10 g/m$^2$ and less than or equal to 300 g/m$^2$, greater than or equal to 10 g/m$^2$ and less than or equal to 150 g/m$^2$, greater than or equal to 20 g/m$^2$ and less than or equal to 200 g/m$^2$, greater than or equal to 40 g/m$^2$ and less than or equal to 120 g/m$^2$, or greater than or equal to 35 g/m$^2$ and less than or equal to 80 g/m$^2$). Other ranges are also possible. The basis weight may be determined according to the standard ISO 536:2012.

As described above, in some embodiments, a filter media may comprise a support layer that is a meltblown layer. In some such embodiments, the filter media may include two support layers that are meltblown layer(s). For example, the PES fiber web may be positioned between two meltblown layers. Suitable meltblown layer(s) and processes have been described U.S. Publication No. 2009/0120048, filed Nov. 7, 2008, and entitled "Meltblown Filter Medium", and U.S. Publication No. 2012-0152824, filed Dec. 17, 2010, and entitled, "Fine Fiber Filter Media and Processes", each of which is incorporated herein by reference in its entirety for all purposes.

In some embodiments, the average diameter of the meltblown fibers in the meltblown layer (or layers) is greater than or equal to about 0.1 microns, greater than or equal to about 0.2 microns, greater than or equal to about 0.5 microns, greater than or equal to about 1 micron, greater than or equal to about 2 microns, greater than or equal to about 5 microns, greater than or equal to about 10 microns, greater than or equal to about 20 microns, greater than or equal to about 22 microns, greater than or equal to about 24 microns, greater than or equal to about 26 microns, or greater than or equal to about 28 microns. In some instances, the meltblown fibers may have an average diameter of less than or equal to about 30 microns, less than or equal to about 28 microns, less than or equal to about 26 microns, less than or equal to about 24 microns, less than or equal to about 22 microns, less than or equal to about 20 microns, less than or equal to about 18 microns, less than or equal to about 16 microns, less than or equal to about 15, microns, less than or equal to about 14 microns, less than or equal to about 12 microns, less than or equal to about 10 microns, less than or equal to about 8 microns, less than or equal to about 6 microns, less than or equal to about 5 microns, less than or equal to about 2 microns, or less than or equal to about 1 micron. Combinations of the above-referenced ranges are also possible (e.g., greater than or equal to about 0.1 microns and less than or equal to about 30 microns, greater than or equal to about 0.2 microns and less than or equal to about 15 microns).

In some embodiments, the meltblown fibers may be continuous. For instance, the meltblown fibers may have an average length of at least about 5 cm, at least about 10 cm, at least about 15 cm, at least about 20 cm, at least about 50 cm, at least about 100 cm, at least about 200 cm, at least about 500 cm, at least about 700 cm, at least about 1000 cm, at least about 1500 cm, at least about 2000 cm, at least about 2500 cm, at least about 5000 cm, at least about 10000 cm; and/or less than or equal to about 10000 cm, less than or equal to about 5000 cm, less than or equal to about 2500 cm, less than or equal to about 2000 cm, less than or equal to about 1000 cm, less than or equal to about 500 cm, or less than or equal to about 200 cm. Combinations of the above-referenced ranges are also possible (e.g., greater than or equal to about 100 cm and less than or equal to about 2500 cm). Other values of average fiber length are also possible.

The meltblown fibers may be formed of any suitable type of synthetic polymer. Examples of suitable synthetic fibers include polyesters (e.g., polybutylene terephthalate), polycarbonate, polyamides (e.g., various nylon polymers), polypropylene, polyolefins, polyvinylidene fluoride (PVDF), and combinations thereof. In some embodiments, the synthetic fibers are organic polymer fibers. Synthetic fibers may also include multi-component fibers (i.e., fibers having multiple compositions such as bicomponent fibers). It should be understood that other types of synthetic fiber types may also be used. The meltblown layer(s) may have any suitable thickness. For example, the meltblown layer(s) may have a thickness of greater than or equal to 0.02 mm, greater than or equal to 0.05 mm, greater than or equal to 0.1 mm, greater than or equal to 0.2 mm, greater than or equal to 0.5 mm, greater than or equal to 1 mm, or greater than or equal to 2 mm. In some embodiments, the meltblown layer(s) may have a thickness of less than or equal to 5 mm, less than or equal to 2 mm, less than or equal to 1 mm, less than or equal to 0.5 mm, less than or equal to 0.2 mm, less than or equal to 0.1 mm, or less than or equal to 0.05 mm. Combinations of the above-referenced ranges are also possible (e.g., greater than or equal to 0.02 mm and less than or equal to 5 mm, or greater than or equal to 0.1 mm and less than or equal to 1 mm). Other ranges are also possible. The thickness of the support layer or layers may be determined according to the standard ISO 534:2011 at 50 kPa.

In certain embodiments, the PES fiber web(s) described herein may be in a waved configuration. For example, the PES fiber web may be part of (or entirely) a filtration layer that is held in a waved configuration, for example, by one or more support layer(s) to maintain separation of peaks and troughs of adjacent waves of the filtration layer. When only one coarse support layer is provided, the support layer can be disposed above (e.g., upstream) or below (e.g., downstream) of the PES fiber web. Suitable coarse support layer(s) and waved configurations have been described, for example, in commonly-owned U.S. Pat. No. 7,883,562 and in commonly-owned U.S. patent application Ser. No. 15/466,809 (filed Mar. 22, 2017), each of which is incorporated herein by reference in its entirety.

As described above, in some embodiments the PES fiber web may be a filter media or may be one layer in a filter media. Suitable filter media include filter media designed for a variety of applications, such as for water filtration applications (e.g., applications suitable for filtering water and other aqueous fluids such as wastewater, aqueous fluids used in biopharmaceutical processing, aqueous fluids used in microelectronics processing, ink, foods, beverages, beers, and biological fluids such as plasma and blood), air filtration applications, oil filtration applications, and/or fuel filtration applications. While it should be understood that any filter media or fiber web described herein may have any of the properties described herein, it may be preferable for filter media or fiber webs to have different properties depending on the desired application.

For example, in comparison to PES fiber webs for use in filter media suitable for other applications, PES fiber webs for use in filter media suitable for water filtration applications may have a relatively high basis weight, a relatively low mean flow pore size, and a relatively low air permeability. For instance, the basis weight may be greater than or equal to about 0.5 $g/m^2$ and less than or equal to about 30 $g/m^2$, greater than or equal to about 2 $g/m^2$ and less than or equal to about 25 $g/m^2$, or greater than or equal to about 3 $g/m^2$ and less than or equal to about 15 $g/m^2$ as determined according to the standard ISO 536:2012. The mean flow pore size may be greater than or equal to about 0.05 microns and less than or equal to about 4 microns, or greater than or equal to about 0.2 microns and less than or equal to about 2 microns as measured according to ASTM F316 (2003). The air permeability may be greater than or equal to about 0.2 CFM and less than or equal to about 5 CFM, or greater than or equal to about 0.3 CFM and less than or equal to about 1.7 CFM as measured according to ASTM D737-04 (2016) at a pressure of 0.5 inches of water.

As another example, in comparison to PES fiber webs for use in filter media suitable for other applications, PES fiber webs for use in filter media suitable for air filtration applications may have a relatively low basis weight, a relatively high mean flow pore size, and a relatively high air permeability. The basis weight may be greater than or equal to about 0.05 $g/m^2$ and less than or equal to about 1 $g/m^2$, or greater than or equal to about 0.1 $g/m^2$ and less than or equal to about 0.5 $g/m^2$ as determined according to the standard ISO 536:2012. The mean flow pore size may be greater than or equal to about 2 microns and less than or equal to about 20 microns, or greater than or equal to about 8 microns and less than or equal to about 10 microns as measured according to ASTM F316 (2003). The air permeability may be greater than or equal to about 5 CFM and less than or equal to about 40 CFM, or greater than or equal to about 10 CFM and less than or equal to about 30 CFM as measured according to ASTM D737-04 (2016) at a pressure of 0.5 inches of water.

As a third example, in comparison to PES fiber webs for filter media suitable for other applications, PES fiber webs for filter media suitable for fuel filtration applications may have an intermediate basis weight, an intermediate mean flow pore size, and a relatively high air permeability. The basis weight may be greater than or equal to about 0.1 g/m$^2$ and less than or equal to about 3 g/m$^2$, or greater than or equal to about 0.2 g/m$^2$ and less than or equal to about 1.5 g/m$^2$ as determined according to the standard ISO 536:2012. The mean flow pore size may be greater than or equal to about 1 micron and less than or equal to about 20 microns, or greater than or equal to about 2 microns and less than or equal to about 20 microns as measured according to ASTM F316 (2003). The air permeability may be greater than or equal to about 5 CFM and less than or equal to about 40 CFM, or greater than or equal to about 10 CFM and less than or equal to about 30 CFM as measured according to ASTM D737-04 (2016) at a pressure of 0.5 inches of water.

In embodiments where the PES fiber web may be one component of a filter media, the filter media as a whole (including the fiber web and any other layers that are present) may have any suitable basis weight. In some embodiments, the filter media as a whole may have a basis weight of greater than or equal to about 15 g/m$^2$, greater than or equal to about 25 g/m$^2$, greater than or equal to about 30 g/m$^2$, greater than or equal to about 50 g/m$^2$, greater than or equal to about 75 g/m$^2$, greater than or equal to about 100 g/m$^2$, greater than or equal to about 125 g/m$^2$, greater than or equal to about 130 g/m$^2$, greater than or equal to about 150 g/m$^2$, greater than or equal to about 175 g/m$^2$, greater than or equal to about 200 g/m$^2$, greater than or equal to about 225 g/m$^2$, greater than or equal to about 250 g/m$^2$, or greater than or equal to about 300 g/m$^2$. In some embodiments, the filter media as a whole may have a basis weight of less than or equal to about 300 g/m$^2$, less than or equal to about 275 g/m$^2$, less than or equal to about 250 g/m$^2$, less than or equal to about 225 g/m$^2$, less than or equal to about 200 g/m$^2$, less than or equal to about 175 g/m$^2$, less than or equal to about 150 g/m$^2$, less than or equal to about 130 g/m$^2$, less than or equal to about 125 g/m$^2$, less than or equal to about 100 g/m$^2$, less than or equal to about 75 g/m$^2$, less than or equal to about 50 g/m$^2$, less than or equal to about 30 g/m$^2$, or less than or equal to about 25 g/m$^2$. Combinations of the above-referenced ranges are also possible (e.g., greater than or equal to about 15 g/m$^2$ and less than or equal to about 300 g/m$^2$, greater than or equal to about 15 g/m$^2$ and less than or equal to about 130 g/m$^2$, greater than or equal to about 30 g/m$^2$ and less than or equal to about 125 g/m$^2$, greater than or equal to about 25 g/m$^2$ and less than or equal to about 100 g/m$^2$, or greater than or equal to about 50 g/m$^2$ and less than or equal to about 125 g/m$^2$). Other ranges are also possible. The basis weight may be determined according to the standard ISO 536:2012.

In some embodiments, the PES fiber web is one layer of a filter media that has an air permeability under a pressure of 10 inches of water of greater than or equal to about 0.5 CFM, greater than or equal to about 1 CFM, greater than or equal to about 2 CFM, greater than or equal to about 5 CFM, greater than or equal to about 10 CFM, or greater than or equal to about 20 CFM. In some embodiments, the filter media has an air permeability under a pressure of 10 inches of water of less than or equal to about 30 CFM, less than or equal to about 20 CFM, less than or equal to about 10 CFM, less than or equal to about 5 CFM, less than or equal to about 2 CFM, or less than or equal to about 1 CFM. Combinations of the above-referenced ranges are also possible (e.g., greater than or equal to about 0.5 CFM and less than or equal to about 30 CFM, or greater than or equal to about 0.5 CFM and less than or equal to about 20 CFM). Other ranges are also possible. The air permeability may be measured by ASTM D737-04 (2016) at a pressure of 10 inches of water.

In some embodiments, the PES fiber web is one layer of a filter media that has a water permeability of greater than or equal to 0.1 mL/(min*cm$^2$*psi), greater than or equal to 0.2 mL/(min*cm$^2$*psi), greater than or equal to 0.5 mL/(min*cm$^2$*psi), greater than or equal to 1 mL/(min*cm$^2$*psi), greater than or equal to 2 mL/(min*cm$^2$*psi), or greater than or equal to 5 mL/(min*cm$^2$*psi). The filter media may have a water permeability of less than or equal to 10 mL/(min*cm$^2$*psi), less than or equal to 5 mL/(min*cm$^2$*psi), less than or equal to 2 mL/(min*cm$^2$*psi), less than or equal to 1 mL/(min*cm$^2$*psi), less than or equal to 0.5 mL/(min*cm$^2$*psi), or less than or equal to 0.2 mL/(min*cm$^2$*psi). Combinations of the above-referenced ranges are also possible (e.g., greater than or equal to 0.1 mL/(min*cm$^2$*psi) and less than or equal to 10 mL/(min*cm$^2$*psi)). Other ranges are also possible. The water permeability may be measured by exposing a filter media web with an area of 4.8 cm$^2$ to deionized water at a constant pressure of 20 psi and collecting the water that flows through the filter media. The time required for 1000 mL of water to flow through the fiber web is determined, and then the water permeability is determined using the following formula:

$$\text{Water permeability} = \frac{1000\ \text{mL}}{\text{measured time in minutes} * 4.8\ \text{cm}^2 * 20\,psi}.$$

Prior to exposing the fiber web to the deionized water, the fiber web is first immersed in isopropanol and then in deionized water.

The fiber webs described herein may be fabricated using any suitable technique or combination of techniques. In some embodiments, the PES fiber web may be fabricated by one or more of an electrospinning process, a force spinning process, and an electroblowing process. In some embodiments, an electrospinning process is employed. As an example, the material which will form the fibers (e.g., PES) may be dissolved in a composition comprising at least one or more poor solvent(s) and one or more good solvent(s) and then electrospun onto a suitable support. Good solvents may be distinguished from poor solvents by a cloud point titration measurement, which may be performed by dissolving a polymer at 10 wt % in a solvent of interest and slowly adding water in a dropwise manner to the solution at 25° C. After a certain amount of water has been added, the solution will become cloudy, or will pass through the cloud point. If water forms less than 7 wt % of the composition at the cloud point, the solvent is a poor solvent. If water forms greater than or equal to 7 wt % of the composition at the cloud point, the solvent is a good solvent. Non-limiting examples of poor solvents for PES include dimethylformamide (DMF) and dimethylsulfoxide (DMSO). Non-limiting examples of good solvents for PES include dimethylacetamide (DMAc), N-methylpyrrolidone, and tetramethylurea. In some embodiments, the solution may further comprise other components, such as conductivity enhancers (e.g., organic salts and/or surfactants such as tetraethylammonium bromide, tetraoctylammonium chloride, and the like). After the electrospinning process, the electrospun fiber web may optionally be removed from the support.

When a fiber web as described herein is fabricated using an electrospinning process as described above, the composition of the solution comprising the poor solvent(s) and the good solvent(s) may be selected as desired. In some embodiments, the poor solvent(s) may make up greater than or equal to about 50 wt % of the total solvents present (the total solvents present include the good solvent(s) and the poor solvent(s)), greater than or equal to about 55 wt % of the total solvents present, greater than or equal to about 60 wt % of the total solvents present, greater than or equal to about 65 wt % of the total solvents present, greater than or equal to about 70 wt % of the total solvents present, or greater than or equal to about 75 wt % of the total solvents present. In some embodiments, the poor solvent(s) may make up less than or equal to about 80 wt % of the total solvents present, less than or equal to about 75 wt % of the total solvents present, less than or equal to about 70 wt % of the total solvents present, less than or equal to about 65 wt % of the total solvents present, less than or equal to about 60 wt % of the total solvents present, or less than or equal to about 55 wt % of the total solvents present. Combinations of the above-referenced ranges are also possible (e.g., greater than or equal to about 50 wt % and less than or equal to about 80 wt %, or greater than or equal to about 60 wt % and less than or equal to about 75 wt %). Other ranges are also possible.

When a fiber web as described herein comprises PES and is fabricated using an electrospinning process as described above, the PES may be dissolved in the solvent(s) (e.g., the poor solvent(s), the good solvent(s)) at any suitable wt %. In some embodiments, PES may make up, e.g., between 10 wt % and 40 wt % of the resultant solution, between 20 wt % and 40 wt % of the resultant solution, or between 30 wt % and 40 wt % of the resultant solution. Other ranges are also possible.

In some embodiments in which a fiber web as described herein is fabricated using an electrospinning process as described above, the solution employed for electrospinning may comprise one or more wetting agents. These wetting agents may be present in any suitable form (e.g., dissolved, suspended, partially dissolved or suspended). Non-limiting examples of suitable wetting agents include poly(ethylene oxide), poly(ethylene oxide) copolymers, poly(vinyl pyrrolidone), poly(vinyl pyrrolidone) copolymers, poly(propylene oxide), and poly(vinyl alcohol). When present, the wetting agent(s) may make up greater than or equal to about 1 wt % of the solution, greater than or equal to about 2 wt % of the solution, greater than or equal to about 5 wt % of the solution, greater than or equal to about 10 wt % of the solution, or greater than or equal to about 15 wt % of the solution. In some embodiments, the wetting agents make up less than or equal to about 20 wt % of the solution, less than or equal to about 15 wt % of the solution, less than or equal to about 10 wt % of the solution, less than or equal to about 5 wt % of the solution, or less than or equal to about 2 wt % of the solution. Combinations of the above-referenced ranges are also possible (e.g., greater than or equal to about 1 wt % of the solution and less than or equal to about 20 wt % of the solution). Other ranges are also possible.

When a fiber web as described is fabricated using an electrospinning process as described above, the ambient humidity can be selected as desired. In some embodiments, the ambient humidity is greater than or equal to about 10% RH, greater than or equal to about 15% RH, greater than or equal to about 20% RH, greater than or equal to about 25% RH, greater than or equal to about 30% RH, greater than or equal to about 35% RH, greater than or equal to about 40% RH, or greater than or equal to about 45% RH. In some embodiments, the ambient humidity is less than or equal to about 50% RH, less than or equal to about 45% RH, less than or equal to about 40% RH, less than or equal to about 35% RH, less than or equal to about 30% RH, less than or equal to about 25% RH, less than or equal to about 20% RH, or less than or equal to about 15% RH. Combinations of the above-referenced ranges are also possible (e.g., greater than or equal to about 10% RH and less than or equal to about 50% RH, or greater than or equal to about 25% RH and less than or equal to about 35% RH). Other ranges are also possible. In some embodiments, the formation of a fiber web (e.g., by an electrospinning process) may be followed by one or more optional surface treatments. For instance, chemical vapor deposition (CVD) (e.g., plasma enhanced CVD, audio frequency and/or radio frequency plasma enhanced CVD, microwave discharge CVD, atmospheric plasma discharge CVD, DC plasma discharge CVD) may be used to functionalize the fiber web surface. As one example, a fiber web may be exposed to an oxygen plasma. This treatment may cause surface oxidation of the fiber web, may create functional groups such as alcohols and carboxylic acids at the fiber web surface, and/or may increase the hydrophilicity of the fiber web. As another example, one or more monomers (e.g., acrylic acid monomers such as hydroxyethylmethacrylate, fluorinated monomers such as hexafluorobutanoic acid, $CF_4$, $CHF_3$, $C_2F_6$, $C_3F_8$, $C_4F_8$, $C_2F_4$, $C_3F_6$, and the like) may be deposited onto the fiber web using CVD. In some embodiments, the monomers may be deposited in the presence of a carrier gas (e.g., an inert gas such as helium or argon). Depositing these monomers may affect the hydrophobicity of the fiber web surface (e.g., acrylic acid monomers may cause the surface to become more hydrophilic, fluorinated monomers may cause the fiber web surface to become more hydrophobic). In some embodiments, a CVD treatment may comprise exposing the fiber web to ammonia optionally accompanied by one or more inert gases (e.g., helium, argon). Other surface treatments (e.g., other CVD treatments) are also possible.

In some embodiments, the PES fiber web may comprise a coating that is suitable for biofiltration applications. In some embodiments, the coated fiber web may be suitable for use as an absorptive membrane filter. The coating may be capable of interacting with one or more proteins or biomolecules and/or of capturing one or more proteins or biomolecules. In some embodiments, the coating may conformally coat at least a portion of the fibers in the web and/or may not block a significant portion of the pores in the web. Non-limiting examples of suitable coatings for biofiltration applications include polymers such as cross-linked poly(ethylene imine), hydrogels, ligands, positively charged molecules such as positively charged polymers (e.g., polymers comprising one or more quaternized groups, such as quaternized dialkylamine groups), and negatively charged molecules such as negatively charged polymers (e.g., polymers comprising one or more sulfonate groups such as acryloamidsulfonic acid groups, polymers comprising one or more acrylate groups such as hydroxyalkyl acrylate groups, polymers comprising one or more carboxylate groups). The coating may be applied using chemical vapor deposition as described above, or by applying a solution comprising the coating to the fiber web. In some embodiments, a monomer may be applied to the fiber web (e.g., by CVD, in a solution) which may polymerize on the surfaces of at least some of the fibers within the fiber web.

When present, a coating disposed on the fiber web may have any suitable thickness. The thickness of the coating may be greater than or equal to about 50 nm, greater than or equal to about 100 nm, greater than or equal to about 150 nm, greater than or equal to about 200 nm, greater than or equal to about 250 nm, greater than or equal to about 300 nm, greater than or equal to about 350 nm, or greater than or equal to about 400 nm, greater than or equal to about 450 nm. The thickness of the coating may be less than or equal to about 500 nm, less than or equal to about 450 nm, less than or equal to about 400 nm, less than or equal to about 350 nm, less than or equal to about 300 nm, less than or equal to about 250 nm, less than or equal to about 200 nm, less than or equal to about 150 nm, or less than or equal to about 100 nm. Combinations of the above-referenced ranges are also possible (e.g., greater than or equal to about 50 nm and less than or equal to about 500 nm). Other ranges are also possible.

As described above, in some embodiments, a filter media can include a PES fiber web and can include one or more layers in addition to the fiber web. In some cases, the filter media may be formed by stacking two or more layers. Stacked layers may optionally be adhered to one another using any suitable method such as lamination and calendering.

Lamination may involve, for example, compressing two or more layers together using a flatbed laminator or any other suitable device at a particular pressure and temperature for a certain residence time (i.e., the amount of time spent under pressure and heat). For instance, the pressure may be between about 10 psi to about 150 psi (e.g., between about 30 psi to about 90 psi, between about 60 psi to about 120 psi, between about 30 and 60 psi, or between about 120 psi and about 90 psi); the temperature may be between about 75° F. and about 400° F. (e.g., between about 75° F. and about 300° F., between about 200° F. and about 350° F., or between about 275° F. and about 390° F.); and the residence time between about 1 second to about 60 seconds (e.g., between about 1 second to about 30 seconds, between about 10 second to about 25 seconds, or between about 20 seconds and about 40 seconds). Other ranges for pressure, temperature and residence time are also possible.

Calendering may involve, for example, compressing two or more layers together using calendar rolls under a particular linear pressure, temperature, and line speed. For instance, the linear pressure may be between about 50 lb/inch and about 400 lb/inch (e.g., between about 200 lb/inch and about 400 lb/inch, between about 50 lb/inch and about 200 lb/inch, or between about 75 lb/inch and about 300 lb/inch); the temperature may be between about 75° F. and about 400° F. (e.g., between about 75° F. and about 300° F., between about 200° F. and about 350° F., or between about 275° F. and about 390° F.); and the line speed may be between about 5 ft/min to about 100 ft/min (e.g., between about 5 ft/min to about 80 ft/min, between about 10 ft/min to about 50 ft/min, between about 15 ft/min to about 100 ft/min, or between about 20 ft/min to about 90 ft/min). Other ranges for linear pressure, temperature and line speed are also possible.

Example 1

This example compares filter media comprising a PES fiber web to commercially available filter media comprising PES membranes (non-fiber based).

The PES fiber webs were fabricated by an electrospinning process. Two samples were formed by laminating a PES fiber web between two meltblown layers.

Table 1, below, shows the measured surface area, filtration efficiency for 0.2 micron diameter polystyrene spheres, water permeability, BSA throughput, Log Reduction Value, and basis weight for each one of the filter media including a PES fiber web (Samples 1 and 2) and of three commercially available PES membranes (Commercial Samples 1-3). BSA throughput was measured by dissolving 50 mg of BSA in 1 liter of phosphate buffered saline and then passing the BSA solution through the filter media at a pressure of 6 psi.

TABLE 1

| Sample | Measured surface area ($m^2/g$) of the PES fiber web | Filtration efficiency for 0.2 micron diameter polystyrene spheres (%) of the filter media | Water permeability mL/(min*$cm^2$*psi) of the filter media | BSA throughput ($L/m^2$) of the filter media | Log Reduction Value of the filter media | Basis weight ($g/m^2$) of the PES fiber web |
|---|---|---|---|---|---|---|
| Sample 1 | 23 | 80 | 2.0 | 2500 | 1.9 | 5 |
| Sample 2 | 25 | 97 | 1.25 | | 8.25 | 20 |
| Commercial Sample 1 | 8 | 99 | 0.18 | | | 67 |
| Commercial Sample 2 | 6 | 43 | 0.25 | | | 42 |
| Commercial Sample 3 | 8 | 31 | 0.75 | 1650 | | 63 |

The filter media including PES fiber webs had a much higher measured surface area, equivalent or better filtration efficiency, and much better water permeability than the commercial samples. The filter media including PES fiber webs also displayed a high BSA throughput, indicating a lack of clogging during use. Sample 2 also displayed a high Log Reduction Value.

Example 2

This example compares PES fiber webs with varying relative surface areas.

PES fiber webs at varying levels of relative surface area were fabricated by an electrospinning process and their filtration efficiencies for 0.2 micron diameter polystyrene spheres were measured. Table 2 shows the fiber diameter, basis weight, ratio of maximum pore size to mean flow pore size, water permeability, bead density, relative surface area, and filtration efficiency for 0.2 micron spheres for five of these samples. The basis weight, water permeability, bead density, and filtration efficiency for 0.2 micron diameter polystyrene spheres were measured as described above. The relative surface areas were determined by using a linear correlation of measured relative area with bead area measured using SEM. As shown in Table 2, low numbers of beads per mm$^2$ and low ratios of maximum pore size to mean flow pore size also correlated with filtration efficiency.

TABLE 2

| Fiber web No. | Fiber diameter (harmonic mean; in nanometers) | Basis weight (g/m$^2$) | Water permeability (mL/(min*cm$^2$*psi)) | Ratio of maximum pore size to mean flow pore size | Bead density (beads/mm$^2$) | Relative surface area (%) | Filtration efficiency for 0.2 micron diameter spheres (%) |
|---|---|---|---|---|---|---|---|
| 1 | 122 | 4.6 | 3.6 | 2.50 | | 78.2 | 79 |
| 2 | 130 | 5.4 | 4 | | 6000 | 93.4 | 91 |
| 3 | 130 | 5.4 | 2.6 | 1.75 | 6000 | 92.1 | 88 |
| 4 | 88 | 7.1 | 1.4 | | 10000 | 98.2 | 94 |
| 5 | 98 | 5.8 | 3.2 | 2.24 | 40500 | 90.0 | 80 |

As shown in FIG. 1 and Table 2, fiber webs having higher levels of relative surface area had higher filtration efficiencies for 0.2 micron diameter polystyrene spheres.

Example 3

This example shows the effect of an oxygen plasma treatment on the water permeability of PES fiber webs.

Two PES fiber webs (Samples 3 and 4) produced by an electrospinning process were further treated with oxygen plasma using a CVD process. The water permeabilities of the PES fiber webs were measured before and after this process, and are shown below in Table 3.

TABLE 3

| Sample | Water permeability prior to oxygen plasma treatment (mL/(min*cm$^2$*psi)) | Water permeability after oxygen plasma treatment (mL/(min*cm$^2$*psi)) |
|---|---|---|
| Sample 3 | 1.1 | 4.5 |
| Sample 4 | 2.6 | 3.9 |

For both PES fiber webs, the oxygen plasma treatment increased the water permeability by at least 50%.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fiber web, comprising:

polyethersulfone fibers with an average diameter of less than or equal to 250 nm and greater than or equal to 20 nm, wherein a relative surface area of the fiber web is greater than or equal to 80%, wherein the fiber web has a ratio of maximum pore size to mean flow pore size of greater than or equal to 1.2 and less than or equal to 4, wherein polyethersulfone makes up at least 90 wt % of the fiber web, and wherein the fiber web comprises a wetting agent.

2. A fiber web as in claim 1, wherein the fiber web is an electrospun fiber web.

3. A fiber web as in claim 1, wherein the relative surface area of the fiber web is greater than or equal to 90%.

4. A fiber web as in claim 1, wherein the relative surface area of the fiber web is greater than or equal to 95%.

5. A fiber web as in claim 1, wherein the measured surface area of the fiber web is greater than or equal to 55 $m^2/g$.

6. A fiber web as in claim 1, wherein the measured surface area of the fiber web is greater than or equal to 95 $m^2/g$.

7. A fiber web as in claim 1, wherein the relative surface area of the fiber web is less than or equal to 100%.

8. A fiber web as in claim 1, wherein the measured surface area of the fiber web is less than or equal to 200 $m^2/g$.

9. A fiber web as in claim 1, wherein a filtration efficiency of the fiber web for 4 micron diameter particles is greater than or equal to 80% and less than or equal to 100%.

10. A fiber web as in claim 1, wherein a filtration efficiency of the fiber web for 0.2 micron diameter polystyrene spheres is greater than or equal to 75% and less than or equal to 100%.

11. A fiber web as in claim 1, wherein a filtration efficiency of the fiber web for 0.3 micron diameter DOP particles is greater than or equal to 1% and less than or equal to 40%.

12. A fiber web as in claim 1, wherein the fiber web has a Log Reduction Value of greater than or equal to 3 and less than or equal to 8.81.

13. A fiber web as in claim 1, wherein the polyethersulfone fibers of the fiber web have modified surfaces.

14. A fiber web as in claim 13, wherein the surfaces are modified by a chemical vapor deposition process.

15. A filter media comprising a fiber web as in claim 1.

16. A filter media as in claim 15, further comprising one or more additional layers.

17. A filter media as in claim 15, further comprising a meltblown layer.

18. A filter media as in claim 15, wherein the fiber web is between two meltblown layers.

19. A fiber web as in claim 1, wherein the polyethersulfone fibers have a standard deviation in fiber diameter of less than or equal to 75 nm.

20. A fiber web as in claim 1, wherein the wetting agent comprises poly(ethylene oxide), a poly(ethylene oxide) copolymer, poly(vinyl pyrrolidone), poly(vinyl pyrrolidone) copolymers, poly(propylene oxide), and/or poly(vinyl alcohol).

21. A fiber web as in claim 1, wherein the fiber web comprises a good solvent for polyethersulfone and a poor solvent for polyethersulfone.

22. A fiber web as in claim 21, wherein the good solvent for polyethersulfone comprises DMAc, N-methylpyrrolidone, and/or tetramethylurea.

23. A fiber web as in claim 21, wherein the poor solvent for polyethersulfone comprises DMF and/or DMSO.

24. A filter media comprising the fiber web of claim 1, wherein the filter media is suitable for liquid filtration.

25. A filter media comprising the fiber web of claim 1, wherein the filter media is suitable for water filtration.

* * * * *